United States Patent [19]

Young

[11] 4,215,996

[45] Aug. 5, 1980

[54] CONTROLLING SULFUR PARTICLE HARDNESS

[75] Inventor: Donald C. Young, Fullerton, Calif.

[73] Assignee: Union Oil Company of California, Los Angeles, Calif.

[21] Appl. No.: 634,250

[22] Filed: Nov. 21, 1975

Related U.S. Application Data

[63] Continuation-in-part of Ser. No. 627,660, Oct. 31, 1975, Pat. No. 4,087,498.

[51] Int. Cl.² .............................................. B01D 9/00
[52] U.S. Cl. ..................................... 23/300; 23/308 S
[58] Field of Search ....................... 23/295, 300, 308 S; 423/567, 578; 71/31

[56] References Cited

U.S. PATENT DOCUMENTS

| | | | |
|---|---|---|---|
| 2,614,908 | 10/1952 | Railsback | 23/295 |
| 3,222,231 | 12/1965 | Markels | 23/295 |
| 3,637,351 | 1/1972 | Young et al. | 23/224 |
| 3,769,378 | 10/1973 | Young et al. | 264/11 |
| 3,830,631 | 8/1974 | Young et al. | 23/252 R |

FOREIGN PATENT DOCUMENTS

| | | |
|---|---|---|
| 1136901 | 12/1968 | United Kingdom . |
| 1203031 | 8/1970 | United Kingdom ...................... 23/295 |
| 1236081 | 6/1971 | United Kingdom ...................... 23/295 |

OTHER PUBLICATIONS

Chemical Engineers Handbook—Perry, McGraw-Hill, N. Y., 1963, 81-8-59.
Chemical Abstracts, v. 47, 12771i, 1953.

*Primary Examiner*—Hiram H. Bernstein
*Attorney, Agent, or Firm*—Dean Sandford; Michael H. Laird

[57] ABSTRACT

Crystalline sulfur particles of predetermined, controlled, relative attrition resistance having diameters less than about 0.5 inch are formed by shock-crystallizing fused sulfur in an agitated quench medium by controlling the fused sulfur temperature at a predetermined level about 238° F. and below 340° F. correlated with the relative particle hardness desired, and controlling the sulfur-quench temperature gradient at a level of at least about 100° F. Crystalline particles having higher relative attrition resistance are obtained at higher fused sulfur temperatures and higher quenching temperature gradients.

5 Claims, 1 Drawing Figure

SULFUR PRILL CRUSHING STRENGTH
FUSED SULFUR TEMPERATURE VS PARTICLE BREAKING PRESSURE

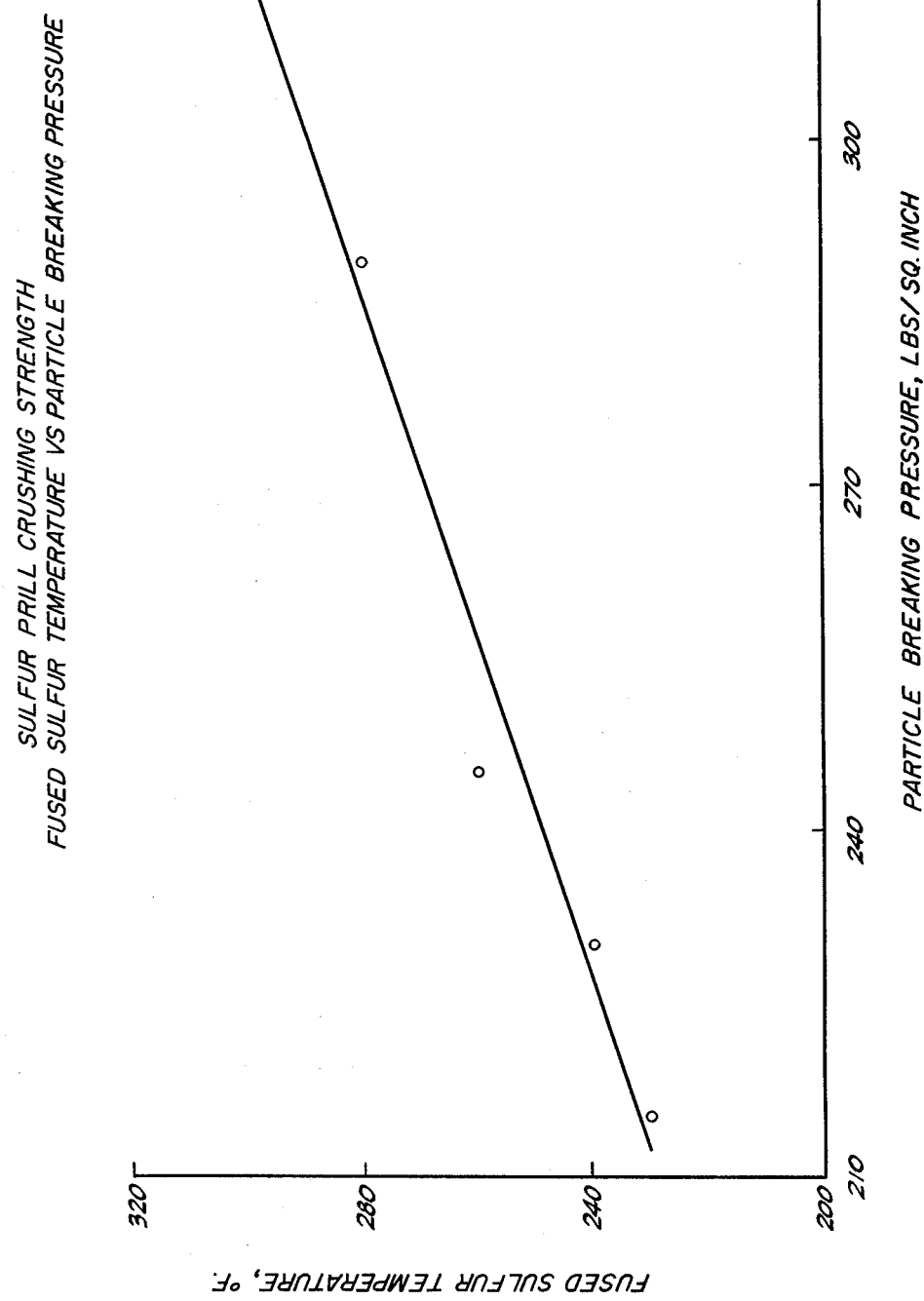

CONTROLLING SULFUR PARTICLE HARDNESS

This application is a continuation-in-part of my copending application Ser. No. 627,660, filed Oct. 31, 1975 now U.S. Pat. No. 4,087,498.

BACKGROUND

Elemental sulfur has found wide application in a number of industries. primarily the agricultural and chemical industries as, for example, a soil amendment, a crop pesticide, a chemical precursor, e.g., sulfuric acid, in rubber compounding, and, more recently, in the fabrication of road surface and structural material compounds. Sulfur can be shipped in molten or crushed block form, or as particles such as those disclosed in my U.S. Pat. No. 3,637,351, 3,769,378 and 3,880,361. These and other forms of sulfur obviously have different physical properties. They may or may not be adulterated with materials to which they are exposed during manufacture or recovery.

One combination of physical properties and structure will not be the best for all uses. For example, in some instances it may be preferable to minimize particle comminution and dusting in shipment, storage or use. Conversely, particles of lower attrition resistance might be preferred over hard particles when the end use involves conversion of the sulfur to a finely divided form such as beads or powders suitable as soil or compounding sulfurs. In the latter case the user would obviously prefer a sulfur which requires little energy to comminute and less expensive light duty equipment. On the other hand, some users are less concerned with the energy requirements than they are with dusting and the difficulties involved in handling finely divided sulfurs.

Hence, it would be advantageous to consistently produce sulfur particles of either high or low relative attribution resistance as dictated by the user's preference. I have now discovered that this objective can be achieved in the manufacture of crystalline particle-form sulfurs having diameters less than about 0.5 inch, and which are obtained by crystallizing fused sulfur in an inert liquid medium.

It is therefore one object of this invention to provide an improved method for producing crystalline alpha-sulfur particles. Another object is the provision of an improved method for producing crystalline sulfur particles which can be easily crushed or otherwise abraded to form finely divided sulfurs. It is another object to provide an improved method for controlling the relative attrition resistance of sulfur particles formed by crystallizing fused sulfur in an agitated liquid medium. Another object is the provision of a method for consistently producing solid sulfur particles having either high or low relative attrition resistance as desired.

These and other objects and aspects of this invention will be apparent to one skilled in the art in view of the embodiments and claims hereof.

In accordance with one embodiment the relative attrition resistance of alpha-sulfur particles formed by shock-crystallizing molten sulfur in a continuous, agitated liquid phase, is controlled by controlling the temperature of the fused sulfur immediately prior to crystallization, and the quenching temperature gradient. Quenching temperature gradient is a function of the temperature gradient through which the molten sulfur is quenched defined by the temperature difference between the fused sulfur and quench medium. Briefly, I have found that higher fused sulfur temperatures and higher quenching temperature gradients produce harder alpha-sulfur particles, and that, accordingly, particles of desired hardness can be consistently obtained by controlling these dominating parameters. While fused sulfur temperature is by far the most significant and, for that matter, the most flexible control variable, it appears that quenching temperature differential also influences attrition resistance, at least to some extent.

FIG. 1 is a graphic presentation of the correlation between fused sulfur temperature and relative attrition resistance expressed as pounds per square inch.

These products are defined, in part, by relative resistance for the reason that the values characterizing this property are relative and can be compared directly only to particles of similar shape and structure. Thus, while quantitative hardness values provide a consistent internal standard, i.e., a standard relative to particles of similar structure produced by a similar process, they quite often can not be compared directly to hardness values for particles produced by other methods. This is due largely to differences in the shape, homogeneity or other physical characteristics of the particles produced by different methods that can not be readily quantified in absolute terms that are directly comparable for particles of all origins.

"Relative attrition resistance" refers to the resistance of a given particle population to crushing or other types of mechanical attrition relative to the strength of particles produced under otherwise identical conditions although at different fused sulfur temperatures and/or quenching temperature differentials. Thus a particle produced from fused sulfur having a relatively high temperature, e.g., about 320° F., will have a relative attrition resistance greater than that of particles produced under otherwise identical conditions at a lower temperature such as 260° F. although both are quenched to the same temperature in the same medium.

Not the least of the factors affecting apparent hardness are particle size and particle size distribution of a population having some average hardness. Particle size and distribution in turn are influenced by other process variables such as adequacy of dispersion and shear rate in the quench phase. Thus these variables also influence apparent hardness determined by any procedure since they affect particle size and particle size distribution. However, this apparent difference, in actuality, is a function of the analytical technique employed to determine attrition resistance rather than a real difference in hardness per se.

The principles, operation and design of numerous forms of apparatus suitable for determining particle hardness or grindability and for comminuting such particles are known in the art. Some of these are described in the *Chemical Engineers Handbook,* John H. Perry, 4th Ed., McGraw-Hill (1963), at Chapter 8, pages 1–59. This text observes that hardness or grindability is a function of the degree of particle size reduction, apparatus type, i.e., efficiency, and energy consumption.

Adequate evaluations can be obtained by the relatively simple apparatus employed in the examples. The apparatus comprised a vertically disposed air-driven plunger having a flat lower surface for engaging sample particles placed on the flat sample holder immediately beneath the plunger. After positioning a single sample particle, air is supplied slowly to the cylinder driving the plunger, the rate of application being controlled by a restriction needle valve in the air line upstream of the cylinder. This procedure provides for a slow pressure buildup in the cylinder which is continuously read by a pressure gauge between the needle valve and cylinder. Thus the gauge allows continuous readout of the air pressure in the cylinder which can be converted directly to pounds force applied to the plunger (knowing the cross-sectional area of the plunger-driving piston). Pressure is allowed to build up continuously in the cylinder until sample failure, i.e., until the particle cracks into two or more pieces. The pressure applied at the point of failure is used to determine the force on the plunger at the point of particle failure. The relative crushing strength in pounds per square inch is determined from this value using the mathematical transform which assumes an ideal cylindrical particle as discussed hereinafter.

The best procedure for analyzing populations of varying size particles is to segregate the sample into relatively narrow particle fractions. The crushing strength of a plurality of particles from one or more fractions can then be determined. The number average of these values is representative of the selected fraction. Comparison of these averages for each size category establishes particle size influence on apparent hardness. Conversion of the pounds force values to psi (assuming an ideal cylinder having the diameter of the sample particles) minimizes particle size effect and allows expression of the results in conventional units.

As a general rule, particles obtained at quench temperature gradients of at least 100° F. and fused sulfur temperatures of at least 300° F. will exceed 300 psi as determined by the methods described in the examples. Conversely, similar quench temperature gradients and fused sulfur temperatures below about 280° F. will yield particles having relative attrition resistance values below 300 psi. Product consistency can be maintained within 10 psi, and even within 5 psi of a predetermined value over an extended run of more than one or even 10 hours.

The methods of this invention afford several advantages. They can produce crystalline particles of consistent attrition resistance. Conversely, the fused sulfur temperature and/or quenching temperature differential can be changed in a predetermined manner to obtain particles having either higher or lower attrition resistance as desired.

The particles are characterized as consisting essentially of alpha (rhombic) sulfur having particle diameters less than about 0.5, preferably less than about 0.25 inch on the average, and having relative crushing strengths on the order of about 200 to about 400 psi as determined by the procedure described herein.

I have found that small particle diameters are essential due to the necessity of shock-crystallizing the fused sulfur to a temperature below 200° F., preferably below 150° F., in less than 0.5 second, preferably less than 0.1 second to obtain the greatest degree of hardness control. Undoubtedly the material at the outer boundaries of larger particles, i.e., above 0.5 diameter, can be controlled by these methods. However, the interior of these particles would cool gradually due to limited heat transfer through the crust immediately formed upon contact with the quench medium. Thus adequate control over the entire particle could not be obtained. Accordingly, it is essential that the manner of distribution of fused sulfur in the quench medium, and the degree of agitation or shear rate, be sufficient to promote rapid heat transfer and disperse the fused sulfur globules into particles having diameters no greater than 0.5 inch and preferably less than 0.25 inch prior to crystallization.

The explanation of these phenomena has not been established. However, I have observed that particles resulting from the use of high fusion temperatures and high quenching temperature gradients are characterized by much smaller, uniform, crystalline structure. This may be due to the influence of fusion temperature and gradient on the metastable states or combination of such states that occur immediately upon quenching. It is also conceivable that these control parameters govern the manner or mechanism by which the metastable states transform into crystalline alpha sulfur, thereby controlling crystal size, uniformity, structure, homogeneity and the like. For obvious reasons the presence or absence of these effects is difficult to determine since they may occur very rapidly; too rapidly to allow analytical evaluation, e.g., by x-ray diffraction.

It is also possible that the thermal and physical shock induced by rapid quenching from the higher temperatures through the higher gradients bypasses the metastable states or completely overshadows their influence on product structure. Conversely, the combination of lower fusion temperatures and quenching temperature gradients may not induce sufficient thermal shock to overcome the influence of or control the effect of the metastable intermediates. Whether or not these factors explain the observed variations in product hardness, particle hardness is, for some reason, a direct function of fusion temperature and quenching temperature gradient as illustrated in the drawing.

Obviously, the desired particle size can also be obtained by crystallizing droplets of fused sulfur. The droplets can be formed with known apparatus such as continuous or intermittant extruders, sprays, or the like. However, while it is not essential, high shear agitation of the quench phase is preferred to promote rapid heat transfer and uniformity, particularly for the harder particles.

The range of fused sulfur temperatures usable in this process is prescribed at the lower limit by the sulfur melting point, i.e., about 238° F., and at the upper limit by the point at which sulfur polymerization becomes significant, i.e., about 340° F. Temperatures above this level should be avoided since they promote sulfur polymerization which can interfere with the mechanisms required to form the crystalline structure essential to the physical properties desired. Particles having high relative attrition resistance can be obtained by operating at molten sulfur temperatures toward the upper end of this range, i.e., at least about 300° F. but below 340° F. Conversely, particles having lower relative crushing strength are obtained at temperatures below about 280° F.

The quench medium is a continuous liquid phase containing either organic or inorganic liquids having melting points below the temperature at which the quench phase is to be maintained and in which crystalline alpha sulfur is both insoluble and inert. The quench medium should contain compounds or combinations thereof in which the crystalline sulfur product is soluble at 200° F. in amounts of less than 0.1, preferably less than 0.05 weight percent. Suitable compounds include water and the halogenated and unhalogenated ethers, ketones, aldehydes, cyclic and acyclic paraffinic hydrocarbons, monocarboxylic acids having up to about 10 carbon atoms per molecule, and mutually miscible combinations thereof. Illustrative combinations include water with acetic acid, normal or iso-paraffins with aldehydes, ethers, carboxylic acids or combinations of these. Illustrative of organic compounds include methylbutylether; propyl-3,3-dichloro-n-pentyl ether; 2-iodo-n-butyl-2,3-dibromo-n-butyl ether; 1,3-dichlorohexane-4-one; 3-octanone; butyraldehyde; 2,2-dichloro-4-iodohexanal; 2-methyl-3,3-diethylbutane; n-octane; 3-methyl, ethyl-cyclohexane; acetic acid; 2,3-dichloro-n-butanoic acid; 3,3-dibromo-6-fluoroheptanoic acid, and the like. Lower boiling compounds can be used at higher temperatures by maintaining sufficient elevated pressure, reflux condensers, or the like.

The suitability of a given quench composition, i.e., any compound or combination of compounds, can be readily determined by dispersing rhombic sulfur in a sample of the medium, heating to 200° F. with agitation, and sampling the resultant supernatant phase to determine the degree to which the rhombic sulfur has been dissolved. It is also essential that the quench phase be chemically inert toward rhombic sulfur. Thus it should not contain certain compounds known to react with sulfur at elevated temperatures such as ammonia, amines or olefins. When questionable, chemical inertness can be readily evaluated by crystallizing a sample of fused sulfur in the selected medium under operating conditions, and analyzing the liquid and gas phases for materials other than those added to the system by ultraviolet, infrared or mass spectroscopy; gas, liquid or thin layer chromatography; or other appropriate analytical techniques.

Under most circumstances aqueous media, i.e., media containing at least 50 weight percent water, with or without water soluble components, are preferred. This is due to several factors including ease of handling, relatively low cost, high heat capacity and high boiling point. However, the non-aqueous solvents are preferred for making water-free products. A water-free product can be obtained by separating the fused sulfur particles from the non-aqueous quench medium and expelling any residual liquid phase by evaporation.

The quench medium should be maintained at a temperature below about 200° F., generally below about 150° F., and preferably below about 100° F. The volume or mass ratios of quench medium to sulfur must be controlled to maintain the required liquid phase temperature and assure the crystallization rate required for the desired product. Thus the liquid/sulfur volume ratio should be at least about 1/1, preferably at least about 5/1. By these procedures the quench temperature differential can be maintained at a level of at least about 100° F., preferably at least about 150° F. depending on fused sulfur temperature. These conditions are sufficient to completely crystallize and quench the dispersed sulfur particles very rapidly to a temperature of less than 200° F., e.g., within 0.1 second or less.

Adequate agitation or shear rate can be maintained by any one of numerous commercially available devices. Similarly the fused sulfur can be extruded, sprayed or otherwise distributed in the quench medium by any of these several known procedures. However, the combination of these two factors must be sufficient to disperse the fused sulfur into particles having the required small diameters prior to crystallization. The degree of subdivision can be increased, i.e., particle size can be decreased, either with greater fused sulfur dispersion or higher shear rate.

The process can be practiced as a batch or continuous operation as desired. Suitable batch operations are illustrated in Example 1 through 5 which can be reproduced on any scale. However, provision should be made for capturing vapors of noxious or volatile materials such as the lower molecular weight organic substances referred to above. These vapors can be condensed by conventional procedures and recycled to the quench zone.

The procedure can be converted to a continuous operation simply by providing the quench zone with means for introducing and withdrawing the quench medium at some elevation above the bottom of the quench vessel. The sulfur particles will settle to the bottom of the vessel and can be withdrawn by removing a portion of the liquid phase along with the crystallized sulfur product. The particles can then be separated from the accompanying liquid phase by screening, decanting or other known physical separation procedures, and dried. The quench phase is then cooled to a temperature sufficient to assure that the average temperature of the quench phase is below the prescribed maximum, i.e., below about 150° F., and is recycled to the quench zone.

EXAMPLE 1

2000 grams of sulfur was heated in an open beaker to a temperature of 305° F. Approximately 300 grams of this material was slowly poured into about 4000 ml of vigorously stirred water maintained at a temperature below about 150° F. The sulfur was highly dispersed and quenched rapidly. The resulting product was recovered by decanting water from the resulting mixture, screening, and air-drying the sulfur particles. The effect of particle size difference on relative hardness was minimized by screening the crystallized product and isolating the relatively narrow particle size fraction which passed 6 mesh U.S. standard screen and were retained on 8 mesh. The crushing resistance of 25 of these particles was then determined by the apparatus described above. The average force required to crush these particles is reported in Table 1, hereinafter, along with the relative crushing strength (psi) obtained by assumption of the idealized right cylindrical model.

In this model, particle size was idealized to that of a regular right cylinder having a diameter corresponding to the mesh opening of the standard screen size on which the particles were retained, i.e., 8 mesh 80.094 inch). Thus the area of correction term for particles retained on the 8 mesh sieve was calculated to be $6.90 \times 10^3$.

EXAMPLES 2 THROUGH 5

The procedure described in Example 1 was repeated at 4 different fused sulfur temperatures—280° F., 260° F., 240° F. and 230° F. The resulting data established the influence of fused sulfur temperature and quench temperature gradient on attrition resistance.

In each instance the particles passing 6 mesh and retained on the 8 mesh sieve were retained as the illustrative sample to eliminate particle size influence. Twenty-five sample particles were evaluated in each instance. The average pounds force required to break the particles are reported in Table 1 along with the relative crushing strength values expressed in pounds per square inch.

Table 1

| Example No. | Sulfur Temp., °F. | Crushing Force/lb. | Relative Attrition Resistance, psi |
|---|---|---|---|
| 1 | 305 | 2.25 | 326 |
| 2 | 280 | 2.00 | 289 |
| 3 | 260 | 1.70 | 246 |
| 4 | 240 | 1.59 | 230 |
| 5 | 230 | 1.49 | 215 |

The relative crushing strength values obtained in Examples 1 through 5 were correlated with the fused sulfur temperature employed in each case. This correlation is presented in FIG. 1 and illustrates a high degree of correspondence between sulfur temperature and relative particle hardness. As a consequence of the accuracy of this correlation, it can be used very effectively to determine the conditions required to obtain harder or softer particles as desired simply by shifting the temperature of the molten sulfur introduced to the quench zone.

I claim:

1. The method of continuously producing sulfur particles having diameters of about 0.5 inch or less and having a selected, discrete, predetermined hardness value within the range of about 200 to about 400 psi. determined by the ideal cylindrical particle model throughout a continuous sulfur particle production run period, which method includes the steps of;
   (a) selecting said discrete, predetermined hardness value between about 200 and about 400 psi.;
   (b) producing a sulfur melt at a discrete, selected, predetermined temperature within the range of about 238° to about 340° F. correlated with said discrete hardness value to obtain said sulfur particles having said discrete hardness value when said sulfur melt is quenched and dispersed into said sulfur particles as hereinafter defined;
   (c) crystallizing the thus formed sulfur melt in an agitated liquid phase quench medium at a temperature below 200° F., which quench medium is selected from the group consisting of organic and inorganic liquids having melting points below the temperature of said quench medium and in which crystalline rhombic sulfur is soluble at 200° F. in amounts of less than about 0.1 weight percent and with which said sulfur is unreactive at said quench medium temperature, and combinations thereof, through a quenching temperature gradient defined as the differential between the respective temperatures of said quench medium and the said sulfur melt of at least about 100° F., with agitation of said quench mediums sufficient to disperse said sulfur melt into particles having diameters of less than about 0.5 inch prior to crystallization thereof;
   (d) consistently maintaining said sulfur melt temperature at said discrete, predetermined value throughout said continuous production run period, and
   (e) consistently maintaining said quenching temperature gradient at a level of at least about 100° F. throughout said continuous production run period to consistently produce said sulfur particles having said discrete, predetermined hardness value.

2. The method of claim 1 wherein the temperature of said sulfur melt is consistently maintained sufficiently proximate said discrete, predetermined temperature level throughout the full extent of the said continuous particle production run period to consistently produce sulfur particles having a hardness value within 10 psi. of said discrete, predetermined hardness value as determined by said ideal cylindrical particle model throughout the full extent of said production run period.

3. The method of claim 1 including the steps of consistently maintaining said sulfur melt at a predetermined, discrete temperature of at least about 300° F. throughout said continuous production run period sufficient to consistently produce sulfur particles having a predetermined, discrete hardness value of at least about 300 psi. throughout said production run period as determined by said ideal cylindrical particle model.

4. The method of claim 1 wherein said sulfur melt is consistently maintained at a discrete, predetermined temperature level of less than 280° F. throughout said continuous production run period correlated with said discrete, predetermined hardness value sufficient to continuously produce sulfur particles having a predetermined, discrete hardness value below about 300 psi. throughout said production run period.

5. The method of claim 3 wherein said quench medium is water, said continuous particle production run period extends for at least about one hour, and said sulfur melt temperature is maintained at said selected, discrete, predetermined value correlated with said discrete, predetermined, particle hardness value for the full extent of said continuous run period of at least about one hour.

* * * * *